United States Patent Office 2,696,443
Patented Dec. 7, 1954

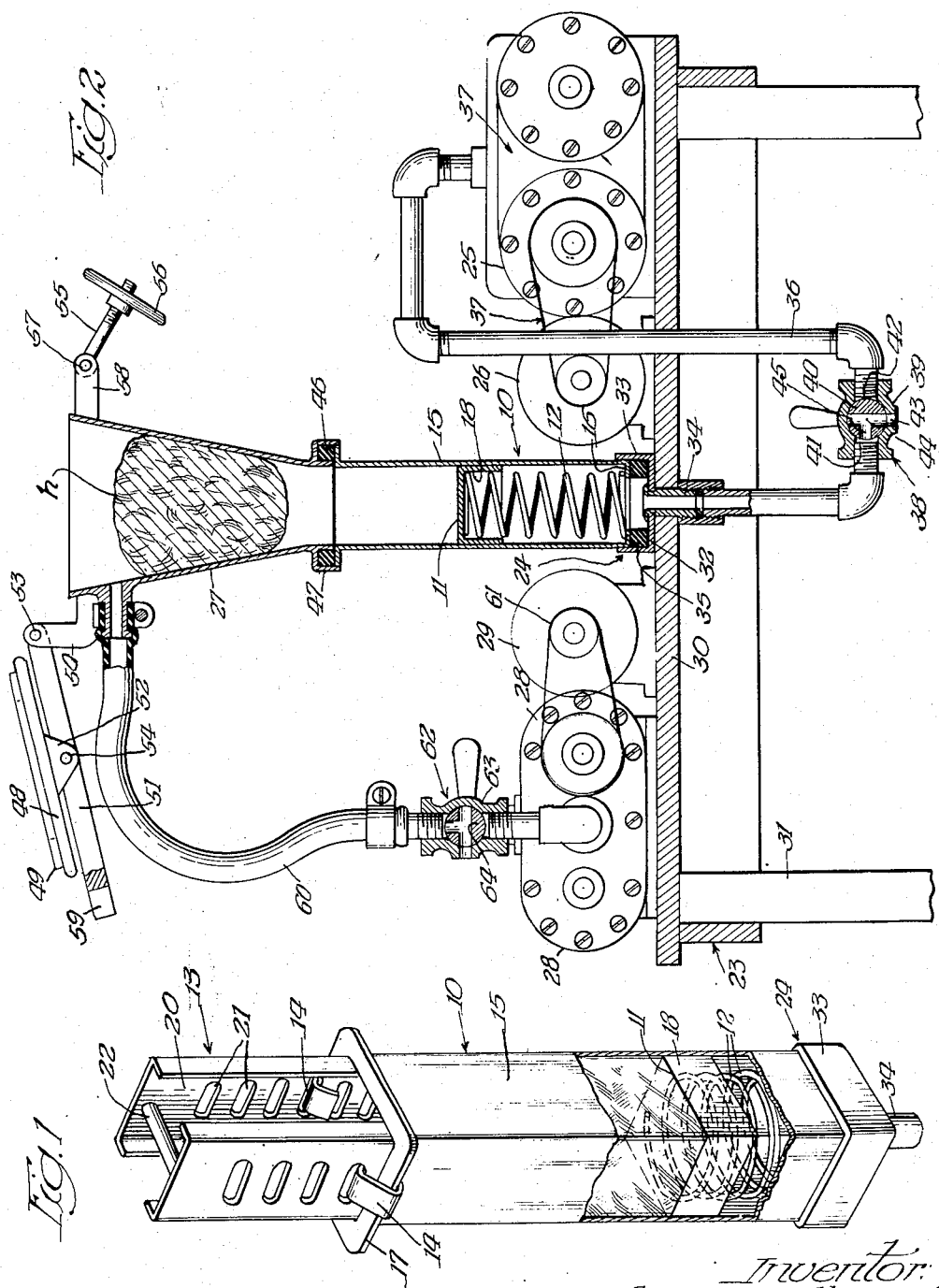

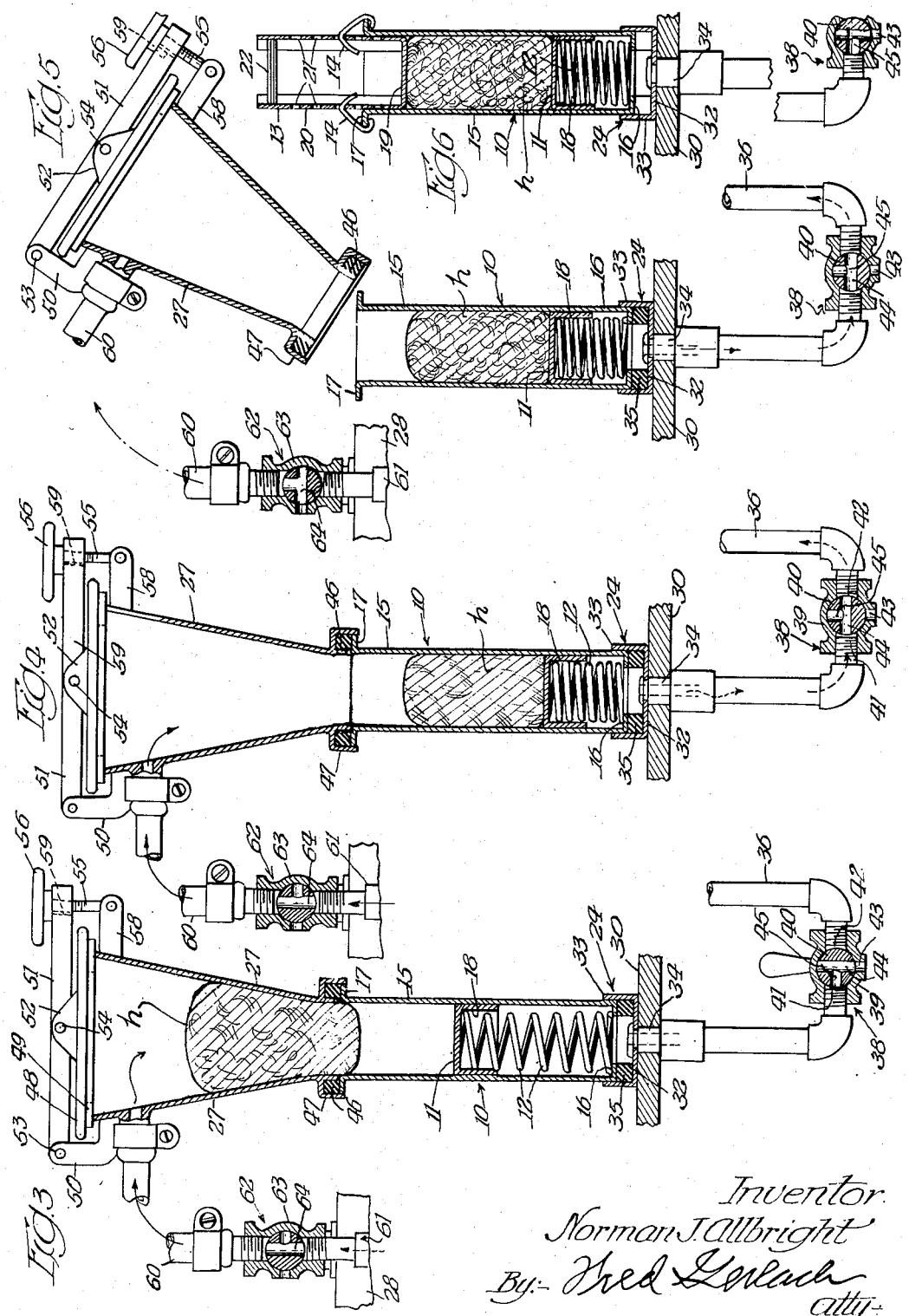

2,696,443

METHOD OF AND APPARATUS FOR PROCESSING A FRESH BONELESS HAM OR THE LIKE

Norman J. Allbright, Chicago, Ill., assignor to The Allbright-Nell Company, Chicago, Ill., a corporation of Illinois Application December 1, 1950, Serial No. 198,634

11 Claims. (Cl. 99—187)

The present invention relates to the art of processing a fresh boneless ham or like piece of meat as a preliminary to use or sale.

As evidenced by my copending United States patent application Serial No. 146,854, filed February 28, 1950, and entitled "Method of, and Apparatus for, Processing Meat," it has heretofore been proposed in connection with the processing of a fresh boneless ham first to place the small end of the ham into the upper end of a vertically extending open ended tubular container of uniform internal cross sectional area from end to end but of less cross sectional area than the maximum cross sectional area (large end) of the ham, then to create such suction within the lower end of the container interior as to cause the ham to slide bodily into the container and be laterally compressed, then to subject the compressed ham while in the container to a cooking environment, such as, hot water, and finally to chill the compressed cooked ham so as to solidify it. By such processing, the solidified ham after removal from the container is of predetermined cross section throughout its entire length and hence may be cut into slices which are all of uniform size and may be used advantageously in the making of sandwiches, the bread slices of which are the same in size.

In practicing the aforementioned ham processing method it has been found that when the ham is moist and soft no difficulty is experienced in introducing the ham into the container by creating suction or a vacuum in the lower end of the container interior and this is directly attributable to the fact that if the ham is moist and soft the small end, when introduced into the upper end of the container, forms an effective airtight seal between it and the container and hence the pressure differential which is created in connection with the application of suction to the lower end of the container interior effectively slides the ham bodily into the container. However, if the ham is comparatively hard, dry and dense difficulty is experienced in inserting the small end of the ham into the upper end of the container so as to form a proper seal which will result in the suction that is subsequently created in the lower end of the container interior causing the ham to slide into the container.

One object of this invention is to provide a ham processing method which is more efficient and faster than, and eliminates the objections to, the heretofore mentioned method. In general the improved method comprises first seating the small end of a funnel shaped member against the upper end of a vertically extending open ended tubular container of the character heretofore mentioned, then introducing the ham into the member while it is positioned so that the small end thereof extends downward, then creating a superatmospheric pressure in the large end of the funnel shaped member in order to slide or shift the ham downwards and effect not only initial insertion of the small end of the ham into the upper end of the container but also formation of a seal between the small end of the ham and the upper end of the container, and then, while the superatmospheric pressure is maintained in the large end of the funnel shaped member, applying such suction to the lower end of the container as to cause the ham to move bodily downwards into the container for molding purposes. By forcing the small end of the ham into the upper end of the container by way of superatmospheric pressure in the upper or large end of the funnel shaped member an effective airtight seal is formed between the small end of the ham and the upper end of the container and hence in connection with subsequent vacuumizing of the lower end of the container interior the ham is quickly and readily forced into the container.

Another object of the invention is the provision of a ham processing method of the aforementioned type and character which contemplates use of a vertically extending open ended tubular container having in the lower end thereof a loose vertically slidable bottom member and a spiral or helical compression spring for urging the bottom member upwards and also having a vertically slidable rigid cover member for closing its upper end after introduction or insertion of the ham into the container interior, and involves creating such a vacuum within the lower end of the container as not only to slide the ham into the container interior but also to move the ham and bottom member downwards a sufficient distance to compress the spring to a substantial extent, and maintaining such vacuum in the lower end of the container until the cover member is inserted to its fullest extent into the upper end of the container and then locked in place. By maintaining suction or vacuum in the lower end of the container until after application or mounting in place of the cover member the spring, when the vacuum is ultimately broken or released prior to removal of the container and placement of it into the cooking environment for ham cooking purposes, urges or forces the bottom member upwards and causes the ham to be lengthwise or endwise compressed between the bottom member and the cover member to the end that the ham after cooking and subsequent chilling will be uniformly dense throughout.

A further object of the invention is the provision of a ham processing method of the type and character under consideration which contemplates use of a funnel shaped member, the upper or large end of which has a removable airtight cover for closing it and also has leading to it a conduit which is connected to a source of air under superatmospheric pressure and embodies in it a two-way valve that is adapted when the plug thereof is in one position to permit air under pressure to flow from the source into the large end of the funnel shaped member, is adapted when the plug is in its other position to cut off the supply of air under pressure and to vent to atmosphere the interior of the large end of the funnel shaped member in order to permit of ready opening of the removable airtight cover.

A still further object of the invention is to provide a simple and novel apparatus which is especially designed and adapted to carry out the aforementioned improved ham processing method.

Other objects of the invention and the various advantages and characteristics of the present method and apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a fragmentary top perspective of an open ended tubular container for use in connection with the method and apparatus constituting the invention;

Figure 2 is a vertical longitudinal section of the apparatus which serves to carry out the improved method and is adapted to effect quick and ready introduction of a fresh boneless ham into the container of Figure 1, the funnel shaped member of the apparatus being shown with the cover thereof in its open position and after the ham has been placed into it with the small end thereof facing downwards;

Figure 3 is a fragmentary vertical section of the apparatus, showing the funnel shaped member with the airtight cover thereof closed and after supply thereto under superatmospheric pressure in order to slide or shift the ham downwards and effect not only initial insertion of the small end of the ham into the upper end of the container, but also formation of a seal between the small end of the ham and the upper end of the container;

Figure 4 is a fragmentary vertical section of the apparatus, illustrating in detail how, after creation of suction or a vacuum in the lower end of the container while air under superatmospheric pressure is maintained in the funnel shaped member, the pressure differential on the ends of the ham causes the ham to slide bodily downwards into the container to such an extent that it depresses the loose bottom member in the lower end of the container and compresses the spiral compression spring under the bottom member;

Figure 5 is a fragmentary section of the apparatus, showing the ham, after removal of the funnel shaped member from the upper end of the container, being held in its downwardly slid position in the container by maintenance of suction or vacuum in the lower end of the container; and Figure 6 is a fragmentary sectional view of the apparatus, illustrating the container after its cover member has been inserted to its fullest extent into the upper end of the container and then locked in place and thereafter the vacuum in the lower end of the container has been broken in order to permit the compression spring to urge the loose bottom member upwards for purposes of compressing the contained or container surrounded ham between the bottom member and the cover member.

The invention comprehends as a preliminary to subsequent cooking and chilling, processing a fresh boneless ham $h$ by introducing the ham into a particular container by way of a particular apparatus. It also involves or comprises the particular hereinafter described method whereby the ham is introduced into the container.

The particular container is best shown in Figure 1 of the drawings and forms the subject matter of, and is specifically claimed in, my copending United States patent application Serial No. 196,925, filed on November 21, 1950, and now Patent Number 2,665,630, issued on January 12, 1954. Reference may be had to such application for a more complete or detailed description of the container. Generally speaking, the container is in the form of an elongated vertically extending open ended tube 10 and has associated with it a bottom member 11, a spring 12, a cover member 13, and a pair of slips 14 for releasably securing the cover member in its hereinafter described operative positions. The tube 10 constituting the container is preferably square in cross section and comprises four vertically elongated rectangular sides 15, the side margins of which are formed integrally with one another. The interior of the container is of uniform cross sectional area from end to end but is of less cross sectional area than the large end of the ham in order that when the ham is introduced into it as hereinafter described it will be under lateral or sidewise compression. The lower end of the container is provided with a continuous inwardly extending right angle flange 16 and the upper end of the container is provided with a continuous outwardly extending right angle flange 17. These two flanges function as hereinafter set forth and serve additionally as reenforcing instrumentalities for the container. The bottom member 11 is in the form of a square metallic plate and is loosely mounted for vertical slidable movement in the lower end of the container. It is adapted to have the lower or small end of the ham $h$ rest on it and embodies a continuous depending marginal skirt 18. The spring 12 is vertically elongated and of spiral or helical character. It is disposed within the lower end of the container and serves after depression of the bottom member 11 in connection with insertion of the ham into the container, to urge the bottom member upwards. The lower end of the spring rests on the continuous inwardly extending flange 16 and the upper end of the spring fits within the skirt 18 and abuts against the bottom surface of the bottom member 11. The cover member 13 is in the form of a one-piece U-shaped metallic stamping and consists of a square bottom piece 19 and a pair of laterally spaced upwardly extending side pieces 20. It is shaped to fit slidably in the upper end of the container and, as hereinafter described, is inserted and secured in place after the ham $h$ is introduced into the container. Each of the side pieces 20 of the cover member is provided with a vertical or longitudinal series of equidistantly spaced transversely extending slots 21. As best shown in Figures 1 and 6 of the drawings, the slots in one of the side pieces of the cover member are horizontally aligned with those in the other side piece. Between the upper ends of the side pieces 20 is a horizontal rod 22. The latter serves to hold the upper ends of the side pieces of the cover member against inward bending and also forms a handle whereby the cover member may be manipulated into and out of its operative position wherein it fits within the upper end of the container. The clips 14 are in the form of one-piece plate metal stampings and are adapted to be associated with, and applied to, the two side pieces 20, respectively. They are C-shaped so far as configuration is concerned and serve releasably to secure the cover member in place. After the cover member is slid downwards until the bottom piece 19 is in abutment with the upper end of the ham $h$ in the container it is contemplated that the lower ends of the clips will be hooked under the central ports of the portions of the flange 17 that are directly outwards of the side pieces 20 of the cover member. Thereafter the clips will be swung inwards in order to bring their upper ends into hooked relation with the adjacent slots in the side pieces of the cover member. When it is desired to remove the cover member the C-shaped clips are swung outwards so as to move their upper ends out of hooked relation with said adjacent slots in the side pieces 20.

The heretofore mentioned apparatus for introducing the ham $h$ into the container is illustrated in Figure 2 of the drawings and embodies as certain of its principal parts a supporting structure 23, a suction head 24, a suction pump 25, a suction pump driving motor 26, a funnel shaped member 27, a centrifugal variety air pump 28 and an electric motor 29 for driving the pump 28. The supporting structure 23 is in the form of a table and consists of a flat top 30 and a plurality of depending legs 31 for supporting the top in an elevated position with respect to the floor of the packing house or other establishment in which the apparatus is employed. The suction head 24 rests on the top surface of the top 30 of the supporting structure 23. It is cup shaped and consists of a square bottom wall 32 and a continuous upstanding side wall 33. The central portion of the bottom wall 32 of the suction head has an aperture in it, is connected to the upper end of a vertically extending pipe nipple 34 which, as shown in Figure 2, extends downwards through a hole in the top of the supporting structure. The continuous side wall 33 of the suction head is connected to, and extends upwards from, the outer marginal portion of the bottom wall 32, and is shaped so as slidably to receive within it the lower end of the container. A square gasket 35 is disposed within the suction head and is adapted when the lower end of the container is positioned in the suction head as shown in the drawings to underlie the continuous inwardly extending flange 16 and form an airtight seal between the lower end of the container and the interior of the suction head. The suction pump 25 is mounted on the top 30 at one side of the suction head 24 and has its suction side connected to such head by a pipe 36. One end of the pipe 36 is connected to the lower end of the vertically extending nipple 34 and the other end of the pipe is connected to the casing of the suction pump 25. Such pump may be of any well known design or construction and serves when in operation to create suction within the suction head by evacuating the air therefrom. The electric motor 26 is mounted on the top 30 in close proximity to the pump 25 and is operatively connected to the latter by way of a belt and pulley connection 37. One of the pulleys of such connection is fixed to one end of the armature shaft of the motor 26 and the other pulley of the connection is fixed to one end of the rotor shaft of the pump 25. The belt of the connection 37 extends around the two pulleys. It is contemplated that when the apparatus is in use the electric motor 26 will be continuously driven for pump driving purposes. Included within the pipe 36 is a two-way valve 38 which consists of a stationary casing 39, and a rotatable handle equipped plug 40 in the casing. The casing of the valve 38 is provided with a pair of diametrically opposite ports 41 and 42 and a port 43 at right angles to the ports 41 and 42. The port 41 communicates with the interior of the part of the pipe that leads to the suction head 24 and the port 42 communicates with the interior of the part of the pipe that leads to the suction pump 25. The port 43 communicates with atmosphere. The plug 40 has formed in it a T-shaped duct consisting of a long branch 44 and a short branch 45. The short branch extends at right angles to the end branch and is connected to the central portion of the long branch. The plug is rotatable 90° back and forth between a suction position and a vent position. When the plug is in its suction position the long branch 44 communicates with the ports 41 and 42 and the short branch 45 is out of communication with the vent port 43 and when the plug is in its vent position the short branch 45 communicates with the port 41, one end of the long branch communicates with the vent port 43 and the other end of the long branch is out of communication with the port 42. The funnel shaped member 27 is square in cross section. It is adapted to have the ham introduced into it with the small end down and serves as a medium or instrumentality for guiding the ham downwards into the container. The lower or small end of the funnel shaped member is shaped conformably to, and adapted to rest on, the upper end of the container, as shown in Figures 2, 3 and 4 and is surrounded by a square gasket 46 which when the member 27 is in its operative position wherein it overlies and rests on the upper end of the container, abuts against the continuous outwardly extending flange 17 and forms an airtight seal between the small end of the funnel shaped member and the upper end of the container. Around the gasket 46 is a square piloting flange 47 which, in connection with mounting of the funnel shaped member in place, slides downwards around the flange 17 into a position wherein it operates to hold the small end of the funnel shaped member against lateral displacement with respect to the upper end of the container. The upper end of the piloting flange extends inwards over the gasket 46 and is welded or otherwise fixedly secured to the small end of the funnel shaped member. The large or upper end of the funnel shaped member 27 is provided with a removable airtight cover 48 for closing it. This cover has a marginal gasket 49 on its under side for engaging the upper edge of the funnel shaped member and is movably supported by way of a hinge type connection comprising a lug 50, an arm 51 and a lug 52. The lug 50 of the hinge type connection is fixedly connected to, and extends upwards from, the large end of the funnel shaped member 27. The arm 51 extends across the cover 48 and has one end thereof pivotally connected to the upper end of the lug 50 by a pin 53. The lug 52 is connected to the central portion of the cover 48 and has the end portion thereof connected to the central portion of the arm 51 by way of a pin 54. When the arm 51 is swung upwards the cover is shifted into its open position and when the arm is swung downwards the cover is shifted into its closed position wherein it seals the interior of the large end of the funnel shaped member 27. The cover is releasably clamped in its closed position by way of an eye-bolt 55 and a nut 56. The eye-bolt is positioned diametrically opposite the upwardly extending lug 50 and has its eye part pivotally connected by a pin 57 to the outer end of a fixed lug 58 on the large end of the funnel shaped member 27. The distal end of the arm 51 is provided with a fork 59 for receiving the shank part of the eye-bolt 55 when it is swung upwards as shown in Figures 3 and 4. The nut 56 is mounted on the outer end of the shank part of the eye-bolt and is adapted when the eye-bolt is in its operative position to engage the upper portion of the fork 59 on the distal end of the arm 51. When the nut is tightened while the eye-bolt is in its operative position it serves through the medium of the arm to clamp the cover in its closed position. When it is desired to shift the cover into its open position the nut is loosened and then the eye-bolt is swung outwards away from the fork 59. This releases the cover so that it may be swung upwards in order to open or expose the interior of the large end of the funnel shaped member. The air pump 28 of the apparatus is suitably mounted on the top 30 of the supporting structure 23 and serves as a medium for supplying air under superatmospheric pressure into the interior of the large end of the funnel shaped member 27. It is located at one side of the suction head 24 and has the outlet thereof connected to the interior of the large end of the funnel shaped member by a flexible conduit 60. The electric motor 29 for driving the pump 28 is mounted on the top 30 in close proximity to the pump 28 and is operatively connected to the latter by a belt and pulley connection 61. One of the pulleys of such connection is connected to one end of the armature shaft of the motor 29 and the other pulley is connected to the one end of the rotary shaft of the pump 28. The belt of the connection 61 extends around the two pulleys. The conduit 60 is preferably in the form of a flexible hose in order that the funnel shaped member 27 may, as hereinafter described, be applied to and removed from the upper end of the container. Included in the conduit 60 is a two-way valve 62 which is like the two-way valve 38 in the pipe 36 and consists of a casing 63 and a rotatable handle equipped plug 64 in the casing. The casing of the valve 62 has two diametrically opposite ports in communication with the interior of the conduit and a port at right angles to the two parts in communication with atmosphere. The plug has a T-shaped duct and is rotatable 90° back and forth between a pressure position wherein the pump is connected to the interior of the large end of the funnel shaped member so as to supply air under superatmospheric pressure thereto; and a vent position wherein the supply of air under superatmospheric pressure is cut off and the interior of the large end of the funnel shaped member 27 is vented to atmosphere.

In connection with processing of the ham $h$ by the apparatus the container without the cover thereon is first positioned in an upstanding position over the top 30 of the supporting structure 31 and then, after proper positioning with respect to the suction head 24, lowered so as to cause its lower end to fit within the suction head. It is contemplated that in connection with such manipulation of the container the valve 38 in the pipe 36 will be in its so-called vent position to the end that the suction head is not subjected to suction by the motor driven suction pump 25. When the container is manipulated into place as hereinbefore pointed out, the compression spring 12 is fully extended and hence holds the bottom member 11 of the container at a maximum distance or height from the lower end of the container. After proper positioning of the container the funnel shaped member 27, while the cover 48 is in its open position and the valve 42 is in its vent position, is manipulated so as to bring the small end thereof into communicating and sealed relation with the upper end of the container, as shown in Figure 2. Thereafter the ham $h$ is placed in the funnel shaped member with its small end facing downwards. After so placing the ham the cover 48 is swung into its closed position and is clamped in place by proper manipulation of the nut equipped eye-bolt 55. As soon as the cover is in its closed position the valve 62 is turned into its pressure position (see Figures 3 and 4) so as to cause delivery of air under superatmospheric pressure into the large end of the funnel shaped member 27. The air under superatmospheric pressure in the large end of the funnel shaped member exerts such downward pressure on the large end of the ham as to cause the ham to feed downwards to such an extent that the small end of the ham becomes inserted into the upper end of the container as shown in Figure 3. It is contemplated that the air that is delivered into the large end of the funnel shaped member will be under such superatmospheric pressure that, in connection with limited downward shift thereof, the lower end of the ham will be forced into sealed relation with the upper end of the container. As soon as the ham has been shifted downwards to a limited extent as shown in Figure 3 and while air under superatmospheric pressure is maintained in the closed large end of the funnel shaped member the valve 38 is turned into its suction position so as to cause the suction pump 25 to create suction or a vacuum in the suction head 24 and the lower end of the container. As soon as the ham is subjected to suction at its small end and air under superatmospheric pressure at its large end it is caused to slide bodily downwards into the container wherein it becomes laterally or sidewise compressed due to the cross sectional area of the container being less than the maximum cross sectional area of the ham. It is contemplated that the amount of suction that is created by the pump 25 will be such that the ham $h$ will be drawn downwards such a distance as to depress the bottom member 11 and compress the spring 12 as shown in Figures 4 and 5. After the ham has been shifted downwards and while the valve 38 is in its suction position the valve 62 is turned into its vent position so as to vent the interior of the funnel shaped member 27. Thereafter the member 27 is removed from the upper end of the container so as to expose the latter. So long as the valve 38 remains in its suction position the ham $h$ in the container retains the bottom member 11 and the spring 12 in their respective depressed and compressed positions. After removal of the funnel shaped member 27 the U-shaped cover member 13 is inserted into the upper end of the container and is slid downwards until its bottom piece 19 abuts against the upper end of the ham. After so manipulating the cover member the two C-shaped clips 14 are manipulated as hereinbefore described in order releasably to secure the cover member in place. After proper application of the clips the valve 38 is turned to its vent position in order to vent to atmosphere the lower end of the container and thus permit the container to be removed from the suction head. Upon release of the vacuum in the lower end of the container the compression spring 12 urges the bottom member 11 upwards so as to effect endwise clamping of the contained or container surrounded ham h between it and the cover member 13. After compressing the ham as heretofore mentioned the container with the ham therein is placed in a cooking environment, such as hot water. It is then subjected to a chilling atmosphere so as to solidify the ham. After endwise removal of the cooked and solidified ham from the container the ham is of uniform cross sectional area and density from end to end and is capable of being sliced into uniform slices for use in the making of sandwiches.

In certain instances it has been found that if the ham is small, moist and soft it may be introduced into the container by the application only of air under superatmospheric pressure to its upper end. If the ham is introduced into the container without the use of suction in the lower end of the container the ham, after removal of the funnel shaped member 27, may be subjected to endwise compression by forcing the cover member 13, in connection with mounting thereof in place, downwards until the spring 12 is under compression.

The herein described ham processing method and apparatus are comparatively simple and when employed result in a most satisfactory final product. The method may be carried out expeditiously and results in substantially positive introduction of the ham into the container even though the ham is comparatively hard and dense and of extremely large size.

Whereas the method and apparatus have been described in connection with processing of a fresh boneless ham it is to be understood that they also may be employed in connection with the processing of any fresh boneless solid piece of meat the mean average cross section of which is greater than the cross sectional area of the container interior. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. That improvement in processing a tapered piece of fresh boneless meat by way of a rigid imporous funnel shaped member and a rigid imporous tubular container of less cross sectional area than the maximum cross sectional area of the piece, which comprises positioning the funnel shaped member so that the small end thereof is in sealed and communicating relation with one end of the container, then inserting the piece of meat into said funnel shaped member so that it engages the inner surface of the member and the small end thereof faces said one end of the container, then creating in the large end of the funnel shaped member such superatmospheric air pressure as to force the entire piece of meat bodily into the container, then releasing said superatmospheric air pressure from the member, and then removing said member from the container and permitting the piece to remain in the container for molding purposes.

2. That improvement in processing a tapered piece of fresh boneless meat by way of a rigid imporous funnel shaped member with a movably mounted airtight cover at its large end and a rigid imporous tubular container of uniform cross sectional area from end to end but of less internal cross sectional area than the maximum cross sectional area of the piece, which comprises first positioning the container vertically and thereafter placing the funnel shaped member above the container and so that its small end extends downwards and is in sealed and communicating relation with the upper end of the container, then while the cover of the member is in its open position inserting the piece of meat into the member so that it engages the inner surface of the member and the small end thereof faces said upper end of the container, then moving the cover of the member into its closed position, then introducing into the cover closed interior of the large end of the funnel shaped member air under such superatmospheric pressure as to cause the entire piece of meat to slide bodily from said member into the container, then releasing the air under superatmospheric pressure from within the funnel shaped member and finally removing said member from the container and permitting the piece of meat to remain in the container to effect molding thereof.

3. That improvement in processing a tapered piece of fresh boneless meat by way of a funnel shaped member and a rigid tubular container of less cross sectional area than the maximum cross sectional area of the piece, which comprises positioning the funnel shaped member so that the small end thereof is in sealed and communicating relation with one end of the container, then inserting the piece of meat into the funnel shaped member so that it engages the inner surface of the member and the small end thereof faces said one end of the container, then simultaneously subjecting the large end of the piece to such superatmospheric pressure and creating such vacuum within the container as to cause the entire piece of meat to move bodily into the container, and then removing the member from the container and permitting the piece to remain in the container to effect molding thereof.

4. That improvement in processing a tapered piece of fresh boneless meat by way of a funnel shaped member and an open ended rigid tubular container of less internal cross sectional area than the maximum cross sectional area of the piece, which comprises positioning the funnel shaped member so that the small end thereof is in sealed and communicating relation with one end of the container, then inserting the piece of meat into the funnel shaped member so that the small end thereof faces said one end of the container, then introducing into the large end of the member and against the large end of the piece air under such superatmospheric pressure as to force the piece so that its small end enters and becomes sealed in said one end of the container, then while the large end of the piece is subjected to said air under superatmospheric pressure creating in the interior of the other end of the container a vacuum of such magnitude that it together with said air under superatmospheric pressure results in the entire piece of meat being forced bodily into the container, and then removing the funnel shaped member from the container and permitting the piece of meat to remain in the container for molding purposes.

5. That improvement in processing a tapered piece of fresh boneless meat by way of a funnel shaped member with a movably mounted airtight cover at its large end and a rigid open ended tubular container of uniform cross sectional area from one end thereof to the other but of less internal cross sectional area than the maximum cross sectional area of the piece, which comprises first positioning the container vertically and thereafter arranging the funnel shaped member so that it is disposed above the container and the small end thereof extends downwards and is in sealed and communicating relation with the upper end of the container, then while the cover of the member is in its open position placing the piece of meat into the member so that the small end thereof faces downwards, then after closing of the cover introducing into the large end of the member and against the large end of the piece air under such superatmospheric pressure as to force the piece so that its small end enters said upper end of the container and becomes sealed therewith, then while the air under superatmospheric pressure is maintained in the large end of the funnel shaped member creating within the interior of the container suction of such magnitude that it together with said air under superatmospheric pressure forces the entire piece of meat into the container for molding purposes, and finally removing the funnel shaped member from the container and permitting the piece to remain in the container for molding purposes.

6. That improvement in the meat packing art which serves to introduce as a preliminary to subsequent cooking and chilling a tapered piece of fresh boneless meat into an open ended rigid tubular container of less internal cross sectional area than the maximum cross sectional area of the piece and with a loose slidably mounted spring loaded bottom member in one end thereof, and comprises first positioning the small end of the piece so that it extends into and is in sealed relation with the other end of the container, then creating within said one end of the container such a vacuum as to cause the entire piece of meat to move bodily into the container to such an extent that it depresses the bottom member against the force of its spring, then while maintaining such vacuum in said one end of the container inserting an elongated cover member into the other end of the container until it engages what was formerly the large end of the piece and subsequently locking the cover member in place, and then breaking the vacuum in said one end of the container in order that the spring operates endwise to compress said piece between the bottom and cover members.

7. That improvement in the meat packing art which serves to introduce as a preliminary to subsequent cooking and chilling a tapered piece of fresh boneless meat into a vertically extending open ended rigid tubular container of less internal cross sectional area than the maximum cross sectional area of the piece and with a loose slidably mounted spring loaded bottom member in its lower end, and comprises first positioning a funnel shaped member so that the small end thereof extends downwards and is in sealed and communicating relation with the upper end of the container, then placing the piece in the funnel shaped member so that the small end thereof faces downwards, then introducing into the large end of the funnel shaped member and against the large end of the piece air under such superatmospheric pressure as to cause the piece so to move towards the container that the small end of the piece enters and seals said upper end of the container, then while maintaining air under superatmospheric pressure in the large end of the funnel shaped member creating such suction within said lower end of the container as to cause the entire piece of meat to move bodily into the container to such an extent that its small end depresses the bottom member against the force of its spring, then while maintaining such suction releasing the air under superatmospheric pressure in the funnel shaped member and removing the latter from said upper end of the container, then while still maintaining such suction inserting an elongated rigid cover member into said other end of the container until it abuts against the large end of the piece and subsequently locking it in place, and then venting said lower end of the container so as to break the suction and release the spring to the end that it causes said piece to be compressed endwise between the bottom and cover members.

8. An apparatus adapted for use in processing a tapered piece of fresh boneless meat as a preliminary to cooking and chilling and comprising an open ended rigid imporous tubular container of uniform cross sectional area from end to end but of less cross sectional area than the maximum cross sectional area of the piece, a rigid imporous funnel shaped member adapted to have the piece placed therein with the small end facing towards the member's small end, and having said small end shaped conformably to, and adapted to fit removably against, one end of the container and provided with gasket means for effecting an airtight seal when it and said one end of the container are in abutting relation, and valve controlled means connected to the funnel shaped member and operative when the piece is in place in the member and the small end of the latter and said one end of the container are in abutting relation to supply into the large end of the funnel shaped member and against the large end of the piece air under such superatmospheric pressure as bodily to force the entire piece of meat from the funnel shaped member into the container for molding purposes.

9. An apparatus adapted for use in processing a tapered piece of fresh boneless meat as a preliminary to cooking and chilling and comprising an open ended rigid imporous tubular container of uniform cross sectional area from end to end but of less cross sectional area than the maximum cross sectional area of the piece, a rigid imporous funnel shaped member provided at its large end with a movably mounted airtight cover, adapted when the cover is in its open position to have the piece placed therein with its small end facing towards the member's small end, and having said small end thereof shaped conformably to, and adapted to fit removably against, one end of the container and provided with gasket means for effecting an airtight seal when it and said one end of the container are in abutting relation, and means operative when the piece is in place in the funnel shaped member, the cover is in its closed position and the small end of the member and said one end of the container are in abutting relation to deliver into the large end of said funnel shaped member and against the large end of the piece air under such superatmospheric pressure as bodily to force the entire piece of meat from said funnel shaped member into the container for molding purposes.

10. An apparatus adapted to use in processing a tapered piece of fresh boneless meat as a preliminary to cooking and chilling and comprising an open ended rigid imporous tubular container of uniform cross sectional area from end to end but of less cross sectional area than the maximum cross sectional area of the piece, a rigid imporous funnel shaped member provided at its large end with a movably mounted airtight cover, adapted when the cover is in its open position to have the piece placed therein with its small end facing towards the member's small end, and having said small end thereof shaped conformably to, and adapted to fit removably against, one end of the container and provided with gasket means for effecting an airtight seal when it and said one end of the container are in abutting relation, and means operative when the piece is in place in the funnel shaped member, the cover is in its closed position and the small end of the member and said one end of the container are in abutting relation to deliver into the large end of said funnel shaped member and against the large end of the piece air under such superatmospheric pressure as bodily to force the entire piece of meat from said funnel shaped member into the container for molding purposes, said means embodying a motor driven air pump and a conduit having one end thereof connected to the pump outlet and its other end connected directly to, and communicating with the interior of, said large end of the funnel shaped member.

11. An apparatus adapted for use in processing a tapered piece of fresh boneless meat as a preliminary to cooking and chilling and comprising an open ended rigid imporous tubular container of uniform cross sectional area from end to end but of less cross sectional area than the maximum cross sectional area of the piece, a rigid imporous funnel shaped member provided at its large end with a movably mounted airtight cover, adapted when the cover is in its open position to have the piece placed therein with its small end facing towards the member's small end, and having said small end thereof shaped conformably to, and adapted to fit removably against, one end of the container and provided with gasket means for effecting an airtight seal when it and said one end of the container are in abutting relation, and means operative when the piece is in place in the funnel shaped member, the cover is in its closed position and the small end of the member and said one end of the container are in abutting relation to deliver into the large end of said funnel shaped member and against the large end of the piece air under such super-atmospheric pressure as bodily to force the entire piece of meat from said funnel shaped member into the container, said means embodying a motor driven air pump and a conduit having one end thereof connected to the pump outlet and its other end connected directly to, and communicating with the interior of, said large end of the funnel shaped member, said conduit having mounted therein a two-way valve adapted when in one position to permit air under pressure to flow from the pump through the conduit and into the large end of the funnel shaped member and when in its other position to cut off the flow of air under pressure through the conduit and vent to atmosphere the interior of said large end of the member.

References Cited in the file of this patent

UNITED STATES PATENTS

| Number | Name | Date |
|---|---|---|
| 253,683 | Catterall et al. | Feb. 14, 1882 |
| 977,372 | Crane | Nov. 29, 1910 |
| 1,115,589 | Seaman | Nov. 3, 1914 |
| 1,157,016 | Lotz | Oct. 19, 1915 |
| 1,267,658 | Green | May 28, 1918 |
| 1,353,613 | Renton | Sept. 21, 1920 |
| 1,975,916 | Bech | Oct. 9, 1934 |
| 2,224,398 | Komarik | Dec. 10, 1940 |